United States Patent [19]

Ortega

[11] Patent Number: 5,030,342
[45] Date of Patent: Jul. 9, 1991

[54] INSTALLATION FOR COLLECTING OILS AND FUELS SPILLED AT SEA

[76] Inventor: D. Ignacio M. Ortega, c/o Lorce no. 9-29ª, 46018—Valencia, Spain

[21] Appl. No.: 557,747

[22] Filed: Jul. 26, 1990

[30] Foreign Application Priority Data

Jul. 26, 1989 [ES] Spain ................................ 8902636

[51] Int. Cl.⁵ ............................................ E02B 15/04
[52] U.S. Cl. .............................. 210/122; 210/242.3; 210/255; 210/522; 210/540; 210/923
[58] Field of Search ............ 210/121, 122, 128, 242.3, 210/255, 258, 522, 540, 923, 257.1

[56] References Cited

U.S. PATENT DOCUMENTS

| 745,519 | 12/1903 | Pravicha et al. | 210/521 |
| 914,138 | 3/1909 | Grahn | 210/255 |
| 1,107,391 | 8/1914 | Welch | 210/242.3 |
| 1,450,545 | 4/1923 | Hans | 210/122 |
| 3,675,771 | 7/1972 | McKee | 210/242.3 |
| 3,788,481 | 1/1974 | deAngelis | 210/242.3 |
| 3,844,944 | 10/1974 | Mercuri | 210/242.3 |
| 4,132,645 | 1/1979 | Bottomley et al. | 210/522 |
| 4,915,823 | 4/1990 | Hall | 210/521 |

FOREIGN PATENT DOCUMENTS 53-33464 3/1978 Japan .
392006 12/1973 U.S.S.R. .

Primary Examiner—Stanley Silverman
Assistant Examiner—Christopher Upton
Attorney, Agent, or Firm—Fleit, Jacobson, Cohn, Price, Holman & Stern

[57] ABSTRACT

An installation for collecting oil or fuel spilled on the sea comprising an oil collecting stage, a first tank and a second tank as cascades, a suction pump and a final tank for separation of oil from water all of which are connected with pipes in the set forth order. The oil collecting stage comprises at least one platform holding a funnel in the center to collect mixture of the oil and water on the surface of the sea and to introduce them to the submerged first tank through a first flexible tubular pipe. The platform is provided with plural buoys which are equally spaced around the platform and connected to retractile cables linking with a descending cable at a junction. The descending cable is guided along with the first flexible pipe into the first tank to be mounted on a pulley secured to the bottom of the first tank and to be fixed to the bottom of a first float in the first tank. The position of the buoys, therefore, the height of the platform is operated with the level of the mixture in the first tank.

3 Claims, 3 Drawing Sheets

INSTALLATION FOR COLLECTING OILS AND FUELS SPILLED AT SEA

BACKGROUND OF THE INVENTION

1. Field of the Invention

The invention which is referred to in this specification with the aid of the additional drawings attached, is an installation which makes it possible, in optimal form and with a high rate of yield, to collect oils and fuels spilled at sea, such as crude oil and the like. This not only avoids the ecological disasters caused by the breakup or sinking of large oil-tankers, but also uses resources for recovering such fuels with minimum costs and so that, once recycled, they can be useful to society. Said installation makes use of a surface cascade or overflow system, inside a set of semi-floating funnels fitted on a platform. They are operated by floating buoys so that a fine layer of oil-water flows on the furface of said funnels, of some two centimetres thickness, and taking advantage of the fact that fuels float on the surface of the sea. Control of the flow of liquid in cascade form into the funnels is calculated and designed to be done intermittently so that, first, all the water of the layer taken in enters: should water enter continuously, the oil would not. The entry of the water-oil flow is automatically regulated so that, as the collecting tanks fill, less liquid enters, thereby improving performance. The final phase or process of the installation consists of an elevation pump for the oil-water mix collected in the tanks, taking it up to the surface inside some tanks where the oil is separated from the water which has been mixed in the process.

2. Description of the Prior Art

The technique currently used to collect energy products such as oil spilled at sea takes in a variety of procedures: one involves the use of special boats which, as they move forward, collect the upper layer through gates, at the same time there are other methods such as hoses for suction of the product, and other highly complex high technology systems. All are extremely expensive and of reduced productivity and profitability, nor do they significantly benefit the ecological damage caused. It has thus become necessary to create a new method, of reduced cost and high yield in the collection of the product, with limited maintenance, and able to be easily placed at the centre of the oil spillage.

SUMMARY OF THE INVENTION

The installation for the collection of oils and fuels spilled at sea, referred to here, consists essentially of one or more orifices set on the surface of the sea so as to enable the entry by overflow or cascade of the product or the oil mixed with the water on said surface: said orifices take the form of funnels fitted on platforms, with floats of a suitable height according to the wave-height, so that the product collected is taken through flexible piping to a tank submerged underwater and which is gradually filled. Said tank has an internal float which, according to the level of the collected product, operates a cable which is connected to the funnel platform buoys to ensure that it is at times underwater and at others above the water level, thereby preventing the tank from filling completely. Between the tank for the reception of the product and a further bottom tank there is a flexible pipe link which makes it possible to once more collect the product close to the upper level, so enriching the energy product saved: finally, from this second tank, at the upper level of its content, it is absorbed by a pump along a flexible pipe which lifts the liquid to a final tank, above the water level, where the oil is collected and the water returned to the sea.

For a better understanding of the general characteristics set out, some drawings are attached which will show a graphic and diagrammatic representation of a practical design for the installation for collection of oils and fuels spilled at sea. It is recorded that, given the particularly informative nature of said drawings, the figures set out there must be considered with the broadest possible criteria, and without any limitation whatsoever.

BRIEF DESCRIPTION OF THE DRAWINGS

The figures in said attached drawings show the following.

DESCRIPTION OF THE PREFERRED EMBODIMENT

Figure 1:
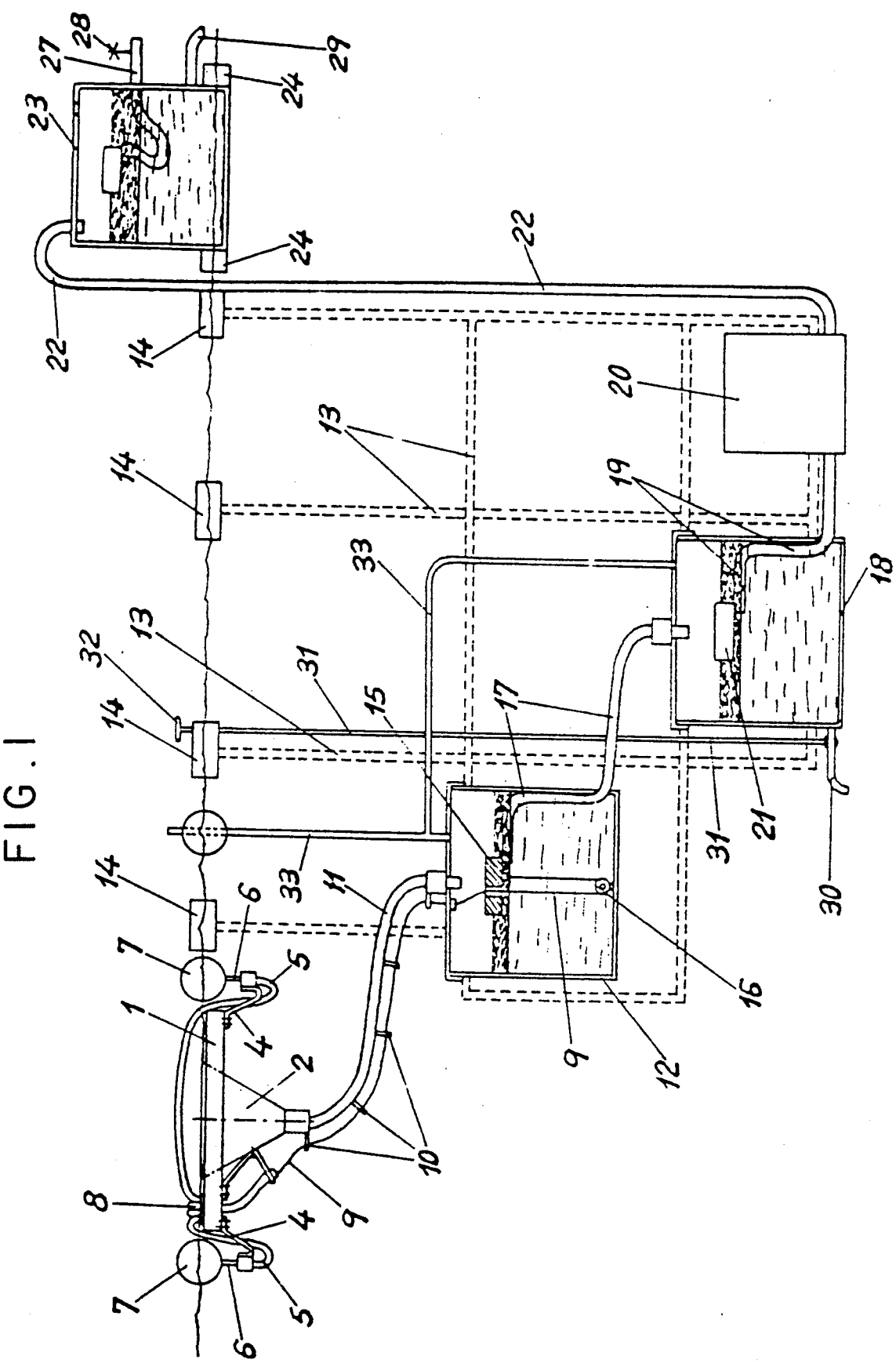
FIG. 1 is a side elevation partly in section of the complete installation, set up at sea and ready for use.
Figure 2:
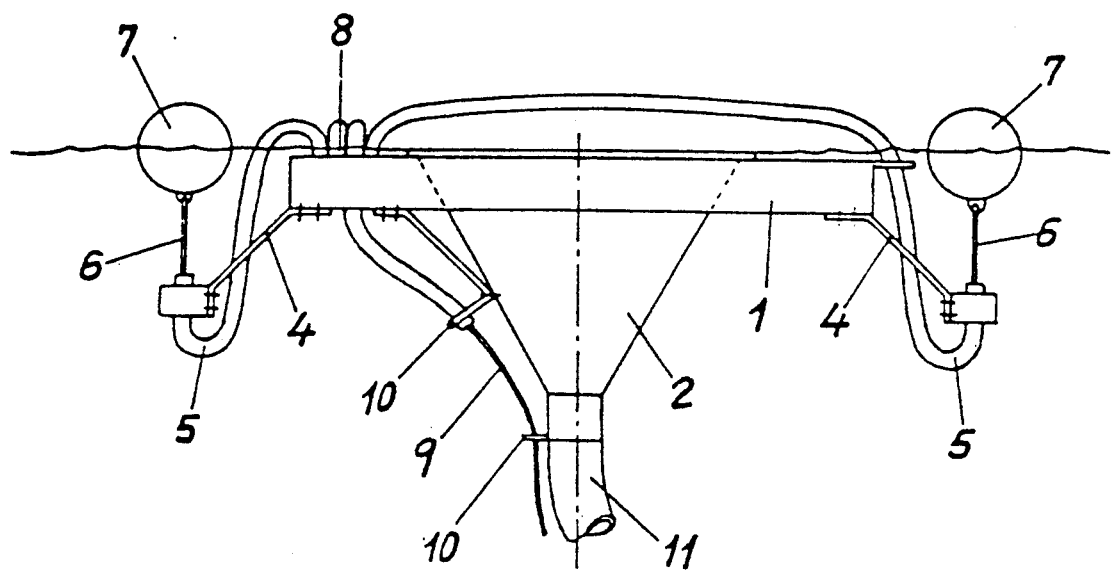
FIG. 2 is a side elevation of one of the funnels through which the liquid falls by cascade, fitted on a platform which has several floats fitted around it on supports: said floats can be adjusted in height according to the volume of liquid in the first collection tank. The funnel is partly submerged, so as to allow the product on the surface of the sea to enter.
Figure 3:
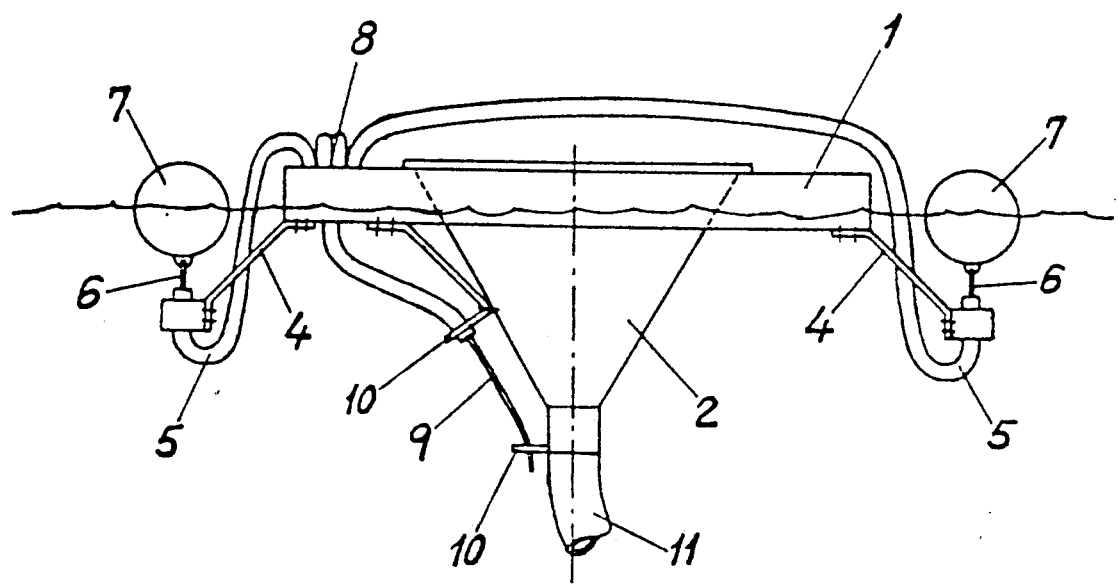
FIG. 3 is the same side elevation as in FIG. 2, but the platform is higher than the surface of the sea, when the first tank is fuller.
Figure 4:
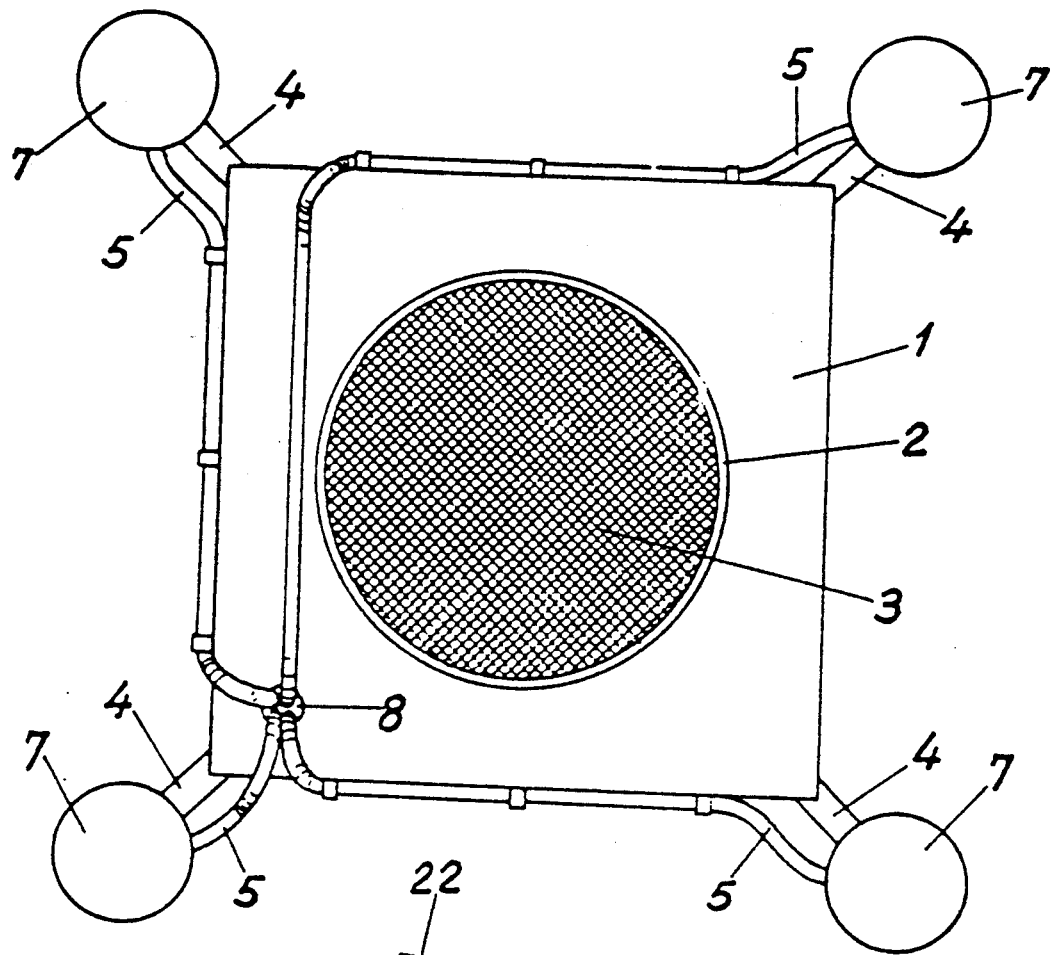
FIG. 4 is a top plan view of one of the platforms with the funnel for the entry by cascade of the product deposited on the surface of the sea: said platform has several adjustable floats spaced around it in such a way as to take any form and size.
Figure 5:
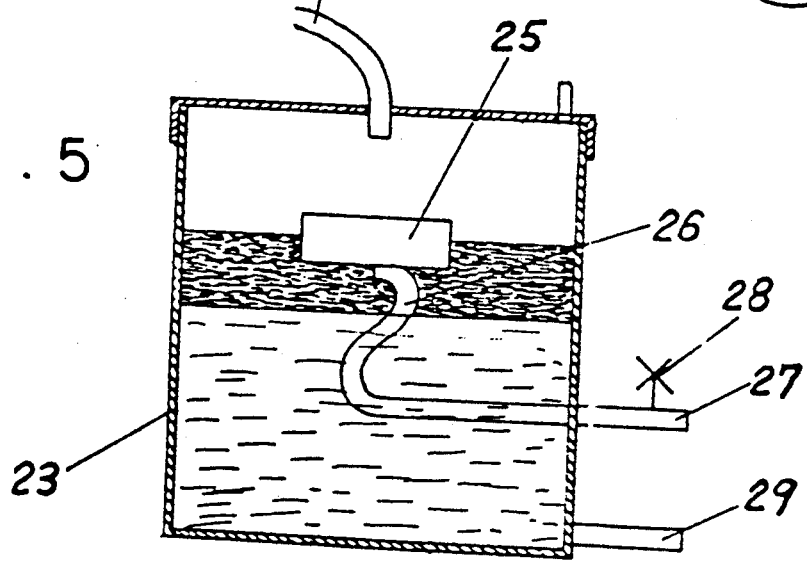
FIG. 5 is a cross-section view of the final tank for the collection of the product, with the outlet pipes for the fuel, which is to be collected in barrels and tanks, and for the water which is returned to the sea. The pipe for the oil is flexible and is secured to the level buoy for correct removal.

Continuing to refer to the attached drawings, it must be pointed out that the different figures set out there incorporate numerical references for the following description of the characteristics and operation, thereby facilitating their immediate location. The semi-floating platform (1) has the opening of the funnel (2) in the central part, with the filter (3) to prevent the entry of impurities and foreign bodies which might damage the installation: at several points, equally spaced around its perimeter, the support strips (4) are placed, at the end of which the piping (5) is fixed which acts as guide for the cable (6) which is secured at the end to the buoys (7) which can be adjusted in height: all the cables (6) of the buoys (7) are linked at the junction (8) where they are all fixed to the descending cable (9) guided by the flanges (10) alongside the funnel (2) and to the input pipe (11) for the product collected. Said product enters the funnel (2) in cascade form at the level corresponding to the surface of the sea which is where the product floats.

The piping (11), which is flexible, is introduced at the top, centered in the tank (12) which is submerged, and fixed to the housing or structure (13) with the buoys or floats (14) so that the liquid gathered goes down into the interior of the tank (12), raising the level plus the interior buoy (15) where the end of the descending cable (9) is secured: it runs on to the pulley (16) secured at the bottom of the tank (12) which exercises a traction effect on said cable (9) lowering the surface buoys (7) as the tank (12) fills so that, as the platform (1) rises to prevent the product from entering in cascade until the level of the liquid in the tank (12) drops once more taking the platform down with it, to resume collecting the product from the surface. These operations are fully automatic.

Inside the tank (12) and a given height for the absorption of the oil on the surface, there is a tube (17) whose end is introduced into the tank (18) through the center of its cover or top, so that the product gathered from the first tank (12) and deposited in the second tank (18) can be collected: said second tank is fitted on the structure (13) at greater depth than tank (12) to allow the liquid to enter.

Inside tank (18) at a suitable height to collect the largest possible amount of oil, there is a pipe (19) which runs to the suction pump (20): said pipe (19) remains inside the tank (18), fixed to the internal buoy (21) and, therefore, in the volume of the liquid contained in said tank, so that the pump does not operate in vacuum. From the pump, the ascending pipe (22) emerges, which places the water-oil mixture in the final tank (23) which is located above the surface of the sea and fitted with floats (24). Inside this tank (23) is the buoy or float (25) to which the flexible pipe (26) is fixed: this pipe is inside the upper mass of oil, with an outlet (27) fitted with a tap or valve (28) to allow collection of the oil for use and storage in drums or tanks: in the bottom of the tank (23) there is a further outlet pipe (29) which allows the clean water to return to the sea.

Naturally, this installation could, for greater performance, have several platforms (1) with their associated funnels (2) for the cascading drop of the water/oil, with the feed pipes to the tanks (12) and (18), to collect the oil in the tank (23) for use.

Tank (18) fitted on the structure (13) has the tap (30) with the ascending operating bar (31) from the outside flywheel (32), so that the structure (13) can be submerged in the sea with the tanks (12) and (18) and the suction pump (20). Through the tap (30), the sea water enters the tanks (12) and (18), avoiding air chambers which would make it more difficult to submerge: once the structure (13) is fully in position, tap (30) is closed to begin the product collection operations.

The variable volume air chambers inside the tanks (12) and (18), depending on the amount of liquid collected, are linked together and with the outside, by the piping (33) so that this air does not create pressure or resistance at the level of the product collected.

Having thus fully described each and every one of the parts making up the installation for the collection of oils and fuels spilled at sea, it needs only to be noted that its different parts can be made in a variety of materials, sizes and shapes, and variations may be made to the design which practice makes advisable, provided that this does not alter the essential points of which this registration for Patent of Invention are the subject.

What is claimed is:

1. An installation for collecting oil spilled on the sea comprising an oil collecting stage; a first tank and a second tank arranged in different levels, a suction pump and a final tank for separation of oil from water; all of which are connected with pipes in the set forth order, the improvement comprising that the oil collecting stage comprises at least one platform having a plurality of supports which are equally spaced around the platform, at least one funnel to collect a mixture of the oil and water on the surface of the sea, the funnel being mounted approximately in the center of the platform and having a first flexible pipe connected to the bottom of the funnel and to the top of the first tank; a plurality of pipes, each having one end secured to each support and a second end linked to the second ends of the remainder of said plurality of pipes at a junction; a plurality of buoys to determine the floatability level of the platform, the buoys being connected to retractable cables which go through said plurality of pipes and are linked to a descending cable at the junction; wherein the first tank is submerged under the sea and has a first float therein, a pulley fixed to the bottom of the tank, and a second flexible pipe having an inlet secured to the first float and an outlet in the top of said second tank; and wherein the descending cable is guided along the first flexible pipe into the first tank, guided under the pulley and fixed to the bottom of the first float, such that the height of the platform is controlled by the level of the first float.

2. The installation as claimed in claim 1, wherein the second tank is submerged more deeply than the first tank, and further comprising a second float inside said second tank and a third flexible pipe having an inlet secured to the second float and an outlet linked to the suction pump; wherein the final tank floats on the sea and is connected to the suction pump by means of an elevation pipe and wherein; the first tank, the second tank and the suction pump are secured to a housing which is submerged and has surface buoys.

3. The installation as claimed in claim 2, wherein the elevation pipe coming out of the suction pump is connected to a top cover of the final tank and the final tank has a final float therein to which an inlet of a final flexible pipe is connected such that the inlet of the final flexible pipe stays in a layer of the oil and only the oil is exhausted through a valve controlled outlet of the final flexible pipe into a container; and wherein the final tank is provided with an outlet pipe at the bottom thereof to exhaust water to the sea.

* * * * *